United States Patent
Edwards

(10) Patent No.: US 9,532,107 B2
(45) Date of Patent: Dec. 27, 2016

(54) CONTENT DISTRIBUTION

(71) Applicants: Sony Corporation, Tokyo (JP); Sony Europe Limited, Surrey (GB)

(72) Inventor: Brian Edwards, Bridgend (GB)

(73) Assignees: SONY CORPORATION, Tokyo (JP); SONY EUROPE LIMITED, Surrey (GB)

( * ) Notice: Subject to any disclaimer, the term of this patent is extended or adjusted under 35 U.S.C. 154(b) by 0 days.

(21) Appl. No.: 14/368,140

(22) PCT Filed: Mar. 19, 2013

(86) PCT No.: PCT/GB2013/050704
§ 371 (c)(1),
(2) Date: Jun. 23, 2014

(87) PCT Pub. No.: WO2013/144578
PCT Pub. Date: Oct. 3, 2013

(65) Prior Publication Data
US 2014/0373054 A1 Dec. 18, 2014

(30) Foreign Application Priority Data

Mar. 28, 2012 (GB) .................................. 1205477.1

(51) Int. Cl.
*H04N 21/478* (2011.01)
*H04N 21/41* (2011.01)
(Continued)

(52) U.S. Cl.
CPC ........ *H04N 21/478* (2013.01); *H04N 21/2353* (2013.01); *H04N 21/23614* (2013.01);
(Continued)

(58) Field of Classification Search
CPC  H04N 21/458; H04N 21/812; H04N 21/8456; H04N 21/4126; H04N 21/44222; H04N 21/454; H04N 21/84; H04N 21/8586; H04N 21/478; H04N 21/4722; H04N 21/4332; H04N 21/23614; H04N 21/2353; H04N 21/47815; H04N 21/6125
See application file for complete search history.

(56) References Cited

U.S. PATENT DOCUMENTS 6,195,692 B1    2/2001 Hsu
6,240,555 B1 *  5/2001 Shoff et al. .................. 725/110
(Continued)

FOREIGN PATENT DOCUMENTS

EP     0 952 737    10/1999
WO     00 43899     7/2000
(Continued)

OTHER PUBLICATIONS

International Search Report Issued Sep. 30, 2013 in PCT/GB13/050704 filed Mar. 19, 2013.
(Continued)

*Primary Examiner* — Chenea Smith
(74) *Attorney, Agent, or Firm* — Oblon, McClelland, Maier & Neustadt, L.L.P.

(57) ABSTRACT

A content receiver useable in a broadcast content distribution system includes a content source that broadcasts audio/video content for reception by content receivers with associated metadata defining links to other content for possible reproduction by the content receiver and information indicative of a category of each link. The content receiver is configured to generate link information for display in dependence upon received metadata relating to links having a subset of categories while reproducing the broadcast audio/video content, and includes a user control operable to select a link for which link information is currently displayed by the content receiver causing the content receiver to reproduce content defined by that link and a category memory
(Continued)

storing category information defining the subset of categories, the content receiver configured to modify stored category information in dependence upon which links are selected using the user control.

21 Claims, 11 Drawing Sheets

(51) Int. Cl.
| | |
|---|---|
| H04N 21/442 | (2011.01) |
| H04N 21/454 | (2011.01) |
| H04N 21/84 | (2011.01) |
| H04N 21/858 | (2011.01) |
| H04N 21/458 | (2011.01) |
| H04N 21/81 | (2011.01) |
| H04N 21/845 | (2011.01) |
| H04N 21/235 | (2011.01) |
| H04N 21/236 | (2011.01) |
| H04N 21/433 | (2011.01) |
| H04N 21/4722 | (2011.01) |
| H04N 21/61 | (2011.01) |

(52) U.S. Cl.
CPC ..... *H04N 21/4126* (2013.01); *H04N 21/4332* (2013.01); *H04N 21/44222* (2013.01); *H04N 21/454* (2013.01); *H04N 21/458* (2013.01); *H04N 21/4722* (2013.01); *H04N 21/47815* (2013.01); *H04N 21/6125* (2013.01); *H04N 21/812* (2013.01); *H04N 21/84* (2013.01); *H04N 21/8456* (2013.01); *H04N 21/8586* (2013.01)

(56) References Cited

U.S. PATENT DOCUMENTS

| | | | |
|---|---|---|---|
| 7,941,817 B2* | 5/2011 | Khusheim | 725/32 |
| 2002/0162120 A1 | 10/2002 | Mitchell | |
| 2002/0162121 A1 | 10/2002 | Mitchell | |
| 2002/0178447 A1 | 11/2002 | Plotnick et al. | |
| 2005/0193410 A1* | 9/2005 | Eldering | 725/34 |
| 2005/0283810 A1* | 12/2005 | Ellis et al. | 725/93 |
| 2006/0168610 A1 | 7/2006 | Noil Williams et al. | |
| 2008/0046939 A1* | 2/2008 | Lu et al. | 725/90 |
| 2008/0062881 A1* | 3/2008 | Martin et al. | 370/238 |
| 2008/0159715 A1 | 7/2008 | Fuasaro et al. | |
| 2009/0262238 A1 | 10/2009 | Hope et al. | |
| 2010/0293598 A1* | 11/2010 | Collart et al. | 726/3 |
| 2012/0072957 A1* | 3/2012 | Cherukuwada .. H04N 21/23412 725/93 |
| 2012/0078712 A1* | 3/2012 | Fontana et al. | 705/14.49 |
| 2012/0311633 A1 | 12/2012 | Mandrekar et al. | |
| 2012/0316965 A1* | 12/2012 | Mathews et al. | 705/14.61 |

FOREIGN PATENT DOCUMENTS

| | | |
|---|---|---|
| WO | 01 72040 | 9/2001 |
| WO | 2011 102886 | 8/2011 |
| WO | WO 2011102886 A1 * | 8/2011 |

OTHER PUBLICATIONS

Great Britain Search Report Issued Jul. 26, 2012 in Application No. GB1205477.1 filed Mar. 28, 2012.

* cited by examiner

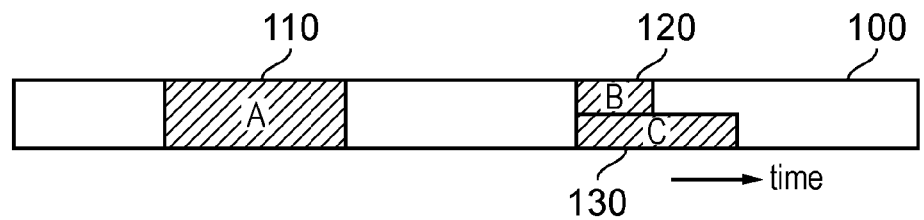
FIG. 3
| ID | TIMECODE | URL | CATEGORY | INFO |
|---|---|---|---|---|
| A | | | | |
| B | | | | |
| C | | | | |
| ... | | | | |
FIG. 4
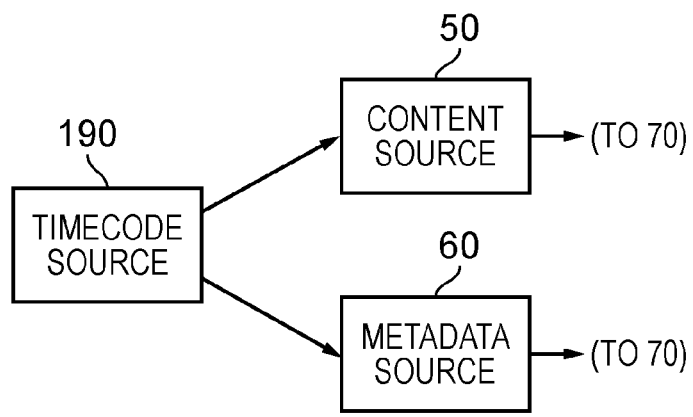
FIG. 5

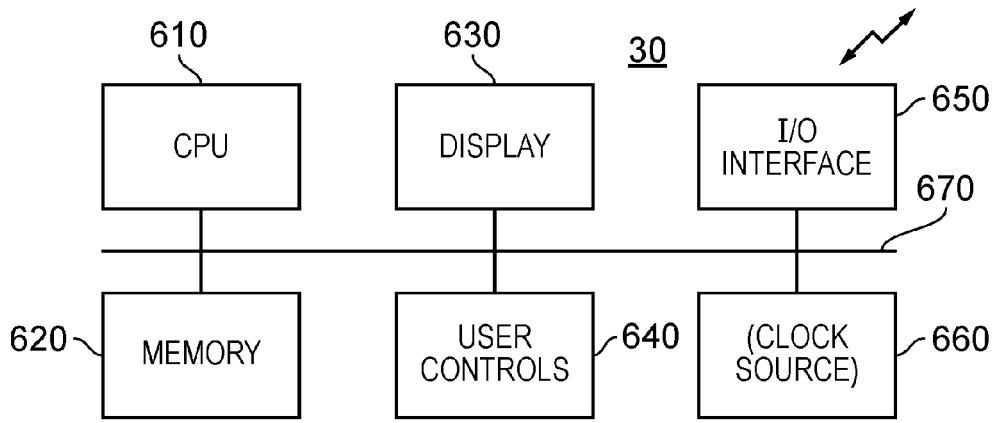
FIG. 14
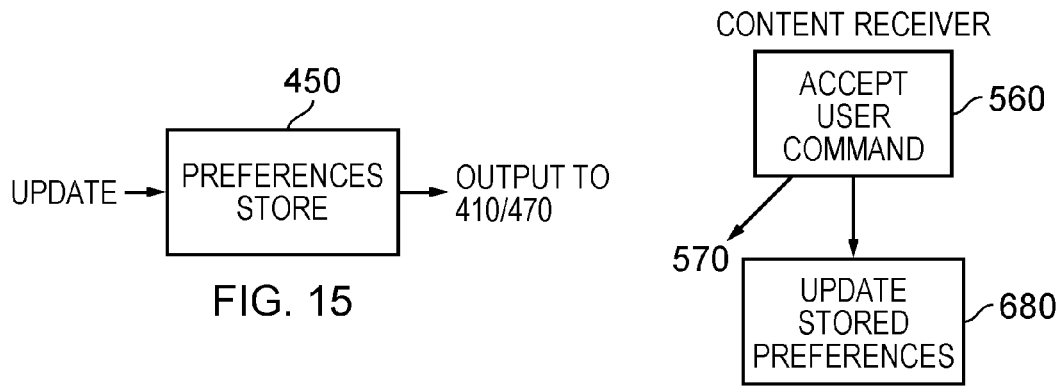
FIG. 15
FIG. 16a
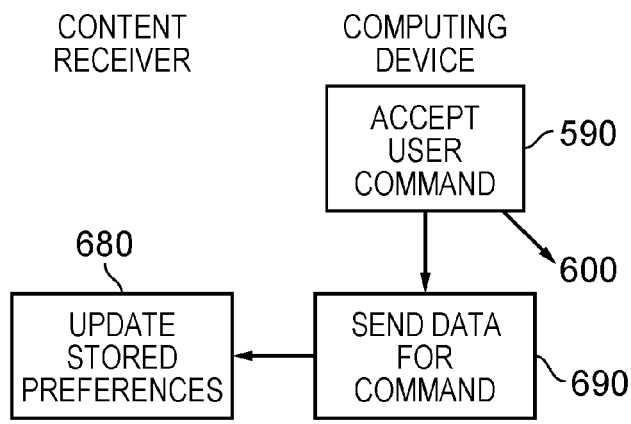
FIG. 16b

| 850 | 860 | 870 |
|---|---|---|
| BREAK TC | CONTENT | CAT DATA |
| $TC_A$-$TC_B$ | A | - - |
| | B | - - |
| | C | - - |

810 →

| 850 | 880 | 870 |
|---|---|---|
| BREAK TC | URL | CAT DATA |
| $TC_A$-$TC_B$ | D | - - |
| | E | - - |
| | F | - - |
| | G | - - |

810' →

CONTENT DISTRIBUTION

CROSS REFERENCE TO RELATED APPLICATION

The present application claims the benefit of the earlier filing date of GB1205477.1 filed in the United Kingdom Intellectual Property Office on 28 Mar. 2012, the entire content of which application is incorporated herein by reference.

BACKGROUND

Field

This disclosure relates to content distribution.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Digital television programming can be transmitted from a content source to content receivers as a broadcast or other distributed signal, for example by a terrestrial, satellite, cable broadcast or an internet protocol (IPTV) or wireless transmission system. A main advantage of a broadcast, rather than a point to point, route is that the signal sent to each receiver is the same; there is no need for the content source to customise the transmitted signal in response to the particular requirements of an individual receiver, as there is with (for example) video on demand or other similar systems.

As well as broadcast programming, it is possible for a content receiver to access content provided by so-called links, such as links to internet-based content.

SUMMARY

This disclosure provides a content reception system having a content receiver useable in a broadcast content distribution system comprising a content source and the content receiver, in which the content source broadcasts audio/video content for reception by content receivers with associated metadata defining links to other content for possible reproduction by the content receiver and information indicative of a category of each link;

the content receiver being configured to generate link information for display in dependence upon received metadata relating to links having a subset of categories while reproducing the broadcast audio/video content;

the content receiver comprising a user control operable to select a link, the selection of a link for which link information is currently displayed by the content receiver causing the content receiver to reproduce content defined by that link;

the content receiver comprising a category memory for storing category information defining the subset of categories, the content receiver being configured to modify the stored category information in dependence upon which links selected using the user control;

the content reception system comprising a computing device connected for data transfer between the content receiver and the computing device;

the content receiver being operable to transmit at least a subset of the metadata to the computing device; and the computing device comprising a display for displaying link information in dependence upon metadata received from the content receiver while the content receiver is reproducing the broadcast audio/video content.

Further respective aspects and features are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, wherein:

FIG. 3 schematically illustrates the broadcast of metadata associated with broadcast content, against time;

FIG. 4 schematically illustrates the structure of an example of broadcast metadata;

FIG. 5 schematically illustrates a part of the transmitter of FIG. 2;

FIG. 14 schematically illustrates a computing device;

FIG. 15 schematically illustrates a preferences store;

FIG. 16a and FIG. 16b are schematic flowcharts illustrating the processing of user commands;

DESCRIPTION OF THE EMBODIMENTS

Figure 1:
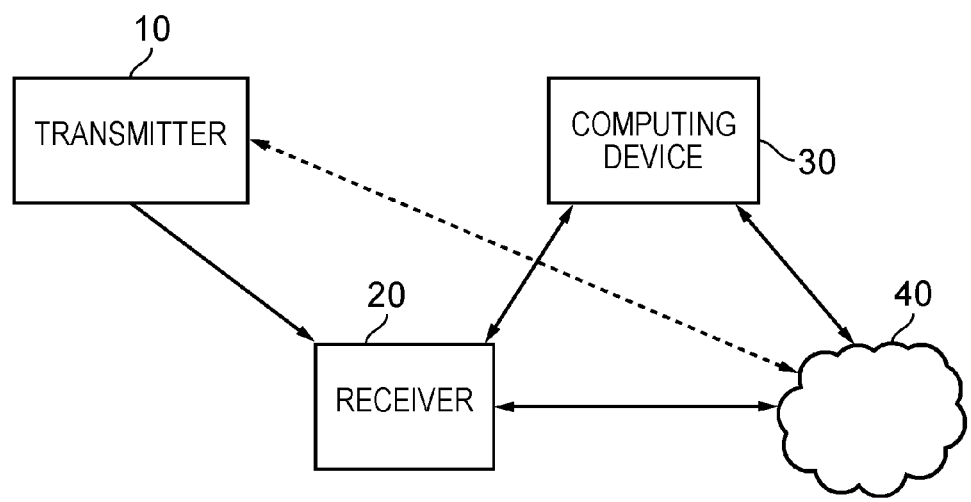
FIG. 1 is a schematic diagram of a content broadcast system.

Referring now to the drawings, FIG. 1 is a schematic diagram of a content broadcast system comprising a head end or transmitter 10, a receiver 20 and a computing device 30. For simplicity, only one receiver 20 is illustrated, but the nature of a broadcast system is that, in general, one transmitter serves multiple receivers. The transmitter 10, the receiver 20 and the computing device 30 are all connectable to an Internet connection 40.

The transmitter 10 may be, for example, a terrestrial television transmitter, a cable television head end, a satellite distribution head end, an Internet Protocol (IP) television head end, a wireless network head end (using a format such as a so-called long term evolution (LTE) or "4G" format, or MPEG DASH (dynamic adaptive streaming over http)) or the like. The transmitter 10 is an example of a content source configured to broadcast audio/video content for reception by content receivers with associated metadata defining links to other content for possible reproduction by the content receiver and information indicative of a category of each link.

The receiver 20 may be an integrated television receiver, in which a single unit comprises equipment for receiving a signal from the transmitter 10, demodulating and decoding the signal and displaying the decoded data on an integrated display screen. As an alternative, the receiver 20 may comprise a so-called set top box (STB) which is a term generally used for a piece of equipment which can demodulate and decode a received television signal but which does not comprise a display screen for displaying the decoded data; instead, the STB is normally connected to a separate display arrangement. The skilled person will of course appreciate that the expression "set-top" does not imply any requirement on the physical position of the STB when in use. The expression simply refers to the fact that the STB is a separate device to the display screen or "set".

The computing device 30 may be, for example, a portable device such as a mobile telephone or so-called "smart phone", a tablet computer, a laptop computer or the like. The computing device 30 is capable of direct communication with the receiver 20. For example, this direct communication can be via a Bluetooth® wireless link established as a short range point-to-point link between the two devices. However, in alternative arrangements the computing device 30 and the receiver 20 may communicate via a local area network such as a wireless (Wi-Fi) local area network, via an infrared optical link the like. A wired link may be used instead of a wireless link.

In at least some of the arrangements to be described below, the transmitter 10 broadcasts audio and video (AV) content in digital form to the receiver 20 (and of course to all of the other receivers capable of receiving broadcast transmissions from the transmitter 10). Along with the AV data, the transmitter 10 sends metadata, again in digital form, defining so-called "links" to other content or information. The links may relate to content stored on the Internet 40, in which case a link may include a so-called URL (uniform resource locator) defining an address on the Internet. As an alternative, a link may relate to other content being broadcast by the transmitter 10 or even by another broadcaster, in which case the link could point to another broadcast channel. Depending on the received metadata and certain data (to be described below) held by the receiver 20, the receiver 20 decides whether to handle the received link information itself, to request the computing device 30 to handle it, or to ignore it. If the receiver 20 handles the link information itself, it may display an invitation to a user of the receiver 20 such that the user can choose whether or not to look at the contents defined by the link. If the receiver 20 passes the link to the computing device 30, the computing device 30 may present an invitation to the user to look at information or content pointed to by the link. Different techniques for handling the broadcast metadata and dealing with link information will be described in detail below.

Figure 2:
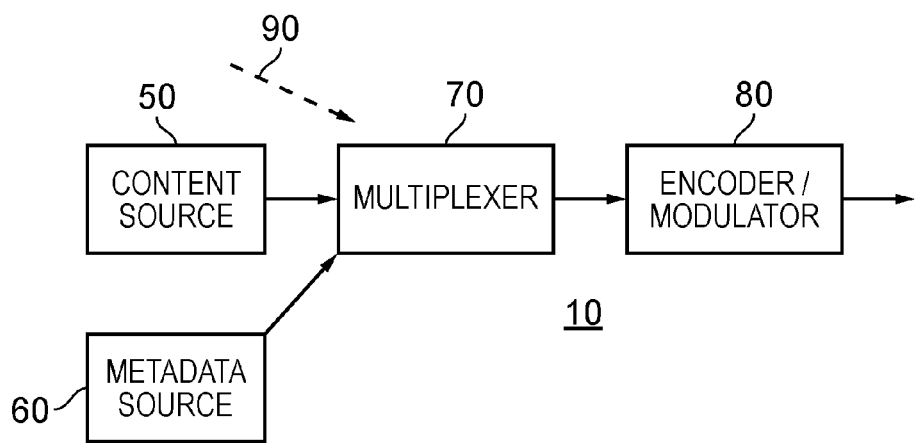
FIG. 2 schematically illustrates a transmitter.

FIG. 2 schematically illustrates a transmitter or head end such as the transmitter 10 of FIG. 1.

Not all parts of the transmitter 10 are shown, but for the purposes of the present discussion the transmitter 10 comprises a content source 50, a metadata source 60, a multiplexer 70 and an encoder/modulator 80.

The content source 50 represents the source of AV content data to be broadcast to the receivers. Depending on the arrangement use, the content source could be a video replay device, one or more live cameras or simply a cable accepting a feed of content from an external source. The metadata source 60 could similarly be part of a video replay device or one or more cameras, or could be provided by a stand-alone computer or the like.

The data from the content source 50 and the metadata source 60 are supplied to the multiplexer 70. Corresponding data from other content sources and/or other metadata sources 90 may also be provided, and the multiplexer 70 multiplexes these different data streams into one or more multiplexed data streams which are supplied to the encoder/modulator 80. So, it will be appreciated that although in some embodiments (and in FIG. 2, for clarity of the description) the transmitter "comprises" the content source and the metadata source, these could in fact be separate systems which the multiplexer accesses in order to obtain the appropriate data for multiplexing.

The encoder/modulator 80 operates according to the broadcast system in use (such as terrestrial, cable, satellite) to encode and modulate the multiplexed data from the multiplexer 70 into a form which can be transmitted to the multiple receivers. In this regard, known techniques are used to encode the multiplexed data onto one or more radiofrequency (RF) carriers, IP streams or the like for transmission. Again, depending on the system in use, the output of the encoder/modulator 80 may be provided to a cable television system, to a terrestrial antenna system or to a satellite uplink system.

As mentioned above, the metadata provided by the metadata source 60 defines (potentially, amongst other things) one or more links which the user may be offered and which the user can choose whether or not to "follow". These links have associated time periods. FIG. 3 schematically illustrates the broadcast of metadata associated with broadcast content, against time.

In FIG. 3, time is represented on a horizontal axis from left to right. The outer rectangle 100 is a schematic representation of the broadcast of the AV content for a particular programme. Shaded boxes 110, 120, 130 overlaying the box 100 schematically illustrate metadata links which accompany the broadcast AV content. It will be seen that the links have associated time periods with reference to the AV content. Depending on the way in which the system is implemented, these may correspond to periods within the AV content during which a particular link is considered relevant to the user. For example, if a link relates to a data source (for example, on the Internet) providing information about a particular model of sports car, it would be relevant to associate a time period for that link with a time period during, for example, a spy movie when the hero is driving that particular model of sports car. So, if the user is watching the spy movie and likes the look of the sports car which is featured in the movie, the user can be offered a link to find out more information about that model of car.

The link represented by metadata A (the box 110) is the only one relevant to that particular time period. In contrast, the links represented by the boxes 120 and 130 overlap in time.

There are various ways of associating links with different time periods in a linearly broadcast programme. In one example, the metadata relating to a link may be broadcast during the time period at which the link is relevant, and not broadcast at other times. So, if the receiver 20 is currently receiving metadata relating to a link, that link is considered by the system operators to be relevant to the AV content which the receiver 20 is currently displaying. There are, however, other ways to make this association. AV content generally has an associated timing signal known as timecode. Each link and its associated metadata can be allocated a timecode range over which it is considered relevant. If this timecode range is broadcast as part of the metadata associated with a link, and if the timecode to which the range refers is accessible at the receiver end, then it is not a requirement to broadcast the link metadata at the exact time at which that link is considered relevant. The link metadata can be broadcast in advance of that time, such that it is stored temporarily at the receiver and enabled when the timecode associated with the link matches the current timecode at the receiver.

Of course, a hybrid system can be employed such that the links have associated timecode ranges but, to avoid congestion of the metadata areas within the multiplexed data for transmission and to avoid any timing difficulties at the receiver, the metadata is still only broadcast during the timecode range when the link is considered relevant.

FIG. 4 schematically illustrates the structure of an example of broadcast metadata.

As discussed above, the relevance of a link defined by the metadata is specified with reference to timecode ranges within the broadcast AV content. However, there are various options as to when the metadata is itself broadcast. One option is only to broadcast the metadata for a particular link during the timecode range in which that link is defined as being relevant to the viewer. Another option is to broadcast all of the metadata repeatedly (for example, as part of a carousel arrangement) and leave it to the receiver to handle the appropriate metadata during the timecode range or ranges when that metadata is defined as being relevant. So, although the generic metadata structure shown schematically in FIG. 4 includes several entries 111, 121, 131 . . . relating to respective links, it will be appreciated that in some embodiments not all of these entries will be broadcast at the same time.

Each entry 111, 121, 131 includes a quasi-unique identifier 140 for that entry. This simply needs to be unique with respect to other entries in the metadata, and indeed in some embodiments it may simply be inferred from other items (such as a URL) included within the metadata entry. The entry includes a timecode range 150 defining a range of timecode within the broadcast AV material when the link referred to by that entry is considered relevant; details of a link 160, which in this example is shown as a uniform resource locator (URL); category information 170 which will be described below, and further data shown generically as an "information" field 180. The information field defines matters such as how and where to display the link to the user, and will be discussed further below with reference to FIGS. 7 and 8.

Note that the timecode range field 150 may in fact define multiple separate timecode ranges over which a particular link is considered relevant. Returning to the example of the spy movie and the sports car, there may be several occasions during the movie when the hero drives the sports car, and so the same link (relating to providing more information about purchase of the sports car) is displayed at each such occasion, with the time periods of all of the display periods being defined by the field 150. Alternatively, a separate entry in the metadata (albeit referring to the same link) may be provided for each such display occasion.

The category information contained in the field 170 forms part of a mechanism by which a multitude of links contained in broadcast metadata provided by the content provider can be sorted into those which are actually presented to the user, and those which are discarded as being irrelevant to the user. This sorting process can take place at the level of an individual receiver. So, many different types of link can be included within the broadcast metadata, but only a subset of those links is displayed to the user of an individual receiver, in dependence upon category information defining that subset which is stored or maintained by the individual receiver.

In general terms, the category information relates to matters such as the genre or the commercial nature of the contents defined by the link. Examples of such categories include "motoring", "tennis", "home maintenance", "video games" and so on. So, one use of the categories is to form a representation of the interest groups of users who may wish to see a link associated with such a category.

In technical terms, the receiver does not need to care what a category represents. So, for example, the categories may be represented within the metadata as encoded values with no associated textual interpretation. No such interpretation needs to be provided to the receiver; all that the receiver needs do is to detect (using techniques such as those to be described below) that a current user is interested in a particular category, and then proceed to display links which have metadata relating the link to that category whenever such links are broadcast (and at timecode is defined by the timecode field 150, if present). As an example, the category "tennis" may be represented by a binary value within the category field of, say, 0100. The receiver does not need to know that this binary value represents "tennis", and indeed, nor does the user. All that is required is that when the metadata is prepared at the content source, the binary value 0100 is consistently used in the category field for metadata relating to the general subject area of "tennis".

The next matter to be addressed is how the receiver learns that the user is interested in a particular category, whether that category is expressed so as to have a textual meaning or just as an encoded value. In one option, the user could select a set of categories of interest (for example, by textual details) at the receiver or (say) at the broadcaster's website for forwarding onto a registered receiver by an internet or over-the-air data transfer. Alternatively or in addition, the receiver can acquire this data, which can (as described below) be used to define a subset of categories, by detecting one or both of: which links the user selects in response to those links being presented to the user; and which channels (and, in more detail, which programmes) the user chooses to watch using the receiver. Arrangements for doing this will be described with reference to FIGS. 15-18 below, but in general terms the receiver keeps a record of which links the user has followed and bases the subset of categories to be displayed to the user on category information associated with the previously followed links. This arrangement can benefit from operating a "learning phase" in which links related to categories outside of the currently defined subset are displayed to the user, in order to give the user the opportunity to show an interest in those categories. Such a learning phase can be carried out at an initial stage of use of the receiver, or from time to time during ongoing use of the receiver, or both. Again, the learning phase will be described further below.

FIG. 5 schematically illustrates a part of the transmitter of FIG. 2, and in particular indicates a possible arrangement by which the content source 50 and the metadata source 60 both operate in response to a common timecode signal from a timecode source 190. The timecode source 190 may provide the common timecode to other content sources and metadata sources which pass data to the multiplexer 70.

Figure 6:
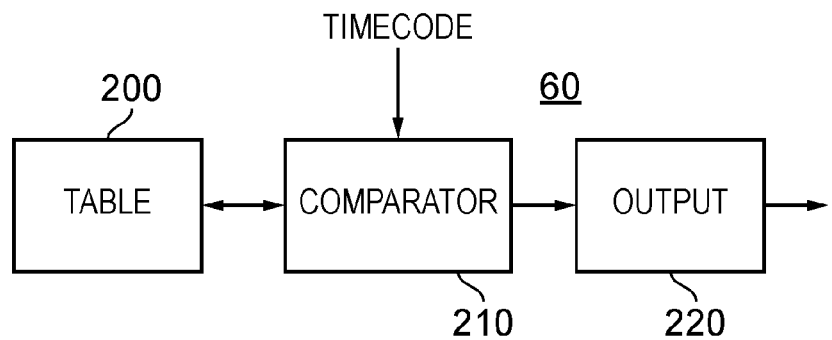
FIG. 6 schematically illustrates a metadata source.

FIG. 6 schematically illustrates an example of a metadata source 60 which receives a timecode signal, for example from the timecode source 190. In this example, the metadata source maintains a table 200 similar in form to that shown in FIG. 4 containing metadata entries relating to the whole of a programme forming part of the AV content to be broadcast from the content source 50. A comparator 210 compares the current timecode received from the timecode source 190 with timecode ranges defined by the table 200. If the timecode range relating to an entry in the table 200 is such that the current timecode is later than the later boundary of the timecode range, then the comparator 210 determines that such an entry is not to be broadcast as metadata, because it is now "out of date". For other entries, the comparator 210 can work in various different ways. For example, as discussed above, the comparator 210 can operate so that only those entries in the table 200 having a respective timecode range which includes the current timecode are broadcast. Alternatively, any entries for which the timecode range has not expired, which is to say that the later boundary of the timecode range is later than or equal to the current timecode, are broadcast. In a further alternative, only those entries for which the timecode range lies within a threshold period of the current timecode (for example, within the next 5 minutes) are broadcast. In this way, the comparator 210 is used to avoid broadcasting irrelevant data from the table 200. An output circuit 220 formats the metadata selected by the comparator 210 into appropriate data to be supplied to the multiplexer 70. As mentioned above, the data can be broadcast on a repetitive or carousel basis, with the comparator 210 updating the contents of the carousel according to comparisons with the current timecode.

Figure 7:
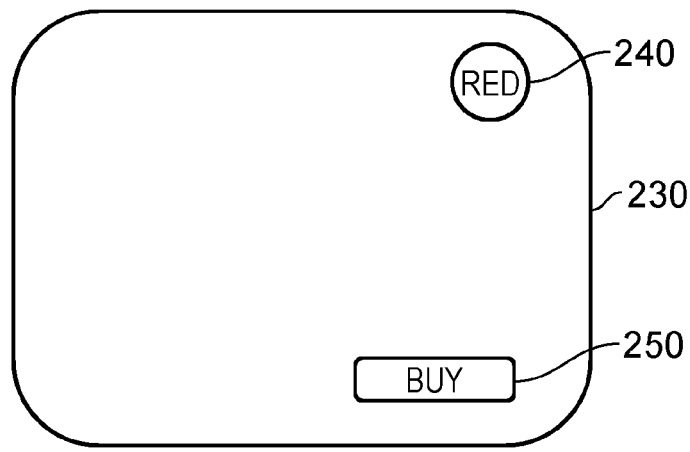
FIGS. 7 and 8 schematically illustrate display positions relating to metadata broadcast to a content receiver.
Figure 8:
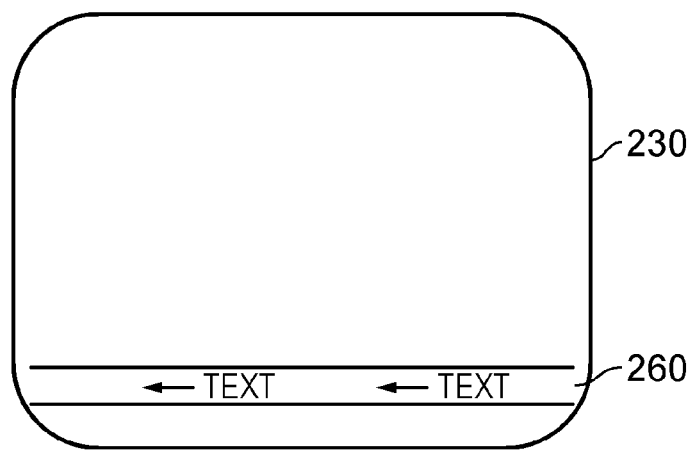

FIGS. 7 and 8 schematically illustrate display positions relating to metadata broadcast to a content receiver. As mentioned above, the manner by which the content receiver should display a link defined by a metadata entry (see FIG. 4) can be established in the information field 180. FIG. 7 schematically illustrates two possible options, on the basis that normally only one of the options would be used (that is, defined by the information field 180) to display a user-selectable link within a display screen 230.

A first option is simply to display a coloured marker 240 such as a red marker as a position, colour, size and shape within the display screen 230 defined by the information field 180. This indicates to the user that if the user presses a button on a remote commander device having the same colour as the marker, the receiver will follow the link which is currently being presented to the user. Because of the use of the system of categories and timecode ranges, there is no need to provide any further data to the user to say what the link is about; instead, the user can simply trust that the link is relevant to both the temporal position within the current programme and the content of the current programme, as well as being related to an interest area of the user.

A second option is to provide a slightly larger link icon such as the icon 250 in FIG. 7 which does include some notional text such as the word "buy", again indicating to the user that if the link is selected, it will provide the opportunity to buy a product which is currently on show within the current programme (at the current timecode range) and which is within a category considered to be of interest to that user.

The icons or markers shown in FIG. 7 can be displayed for the periods, with respect to the AV programme being viewed, defined by the timecode ranges 150 in the corresponding metadata entries. To avoid subjective disturbance to the user, the icons or markers can be faded into view and out of view at the beginning and end of the timecode ranges, for example by varying an "alpha value" or transparency when the icons or markers are rendered. The fade-in and fade-out period could each be, for example, two seconds.

The user can indicate a desire to follow a link defined by an icon on marker by operating a user control. This could involve pressing a coloured button on a remote commander corresponding to the colour of a marker such as the marker 240. Alternatively, it could involve operating a cursor control device to place a cursor over a marker or icon and then operating a key indicating selection of the one or icon under the cursor. Both these options can be achieved using controls provided on a remote commander device.

FIG. 8 schematically illustrates another mode of indicating a link to the user. A rolling text bar 260 is provided, for example towards the lower horizontal edge of the display screen 230, carrying text relating to currently relevant links. The text could be provided within the information field 180 or could be generic text generated by the receiver device such as "click now to select a link to related information". Once again, operation by the user of an appropriately on a remote commander can be used to indicate to the receiver that the user is selecting the currently displayed link.

Figure 9:
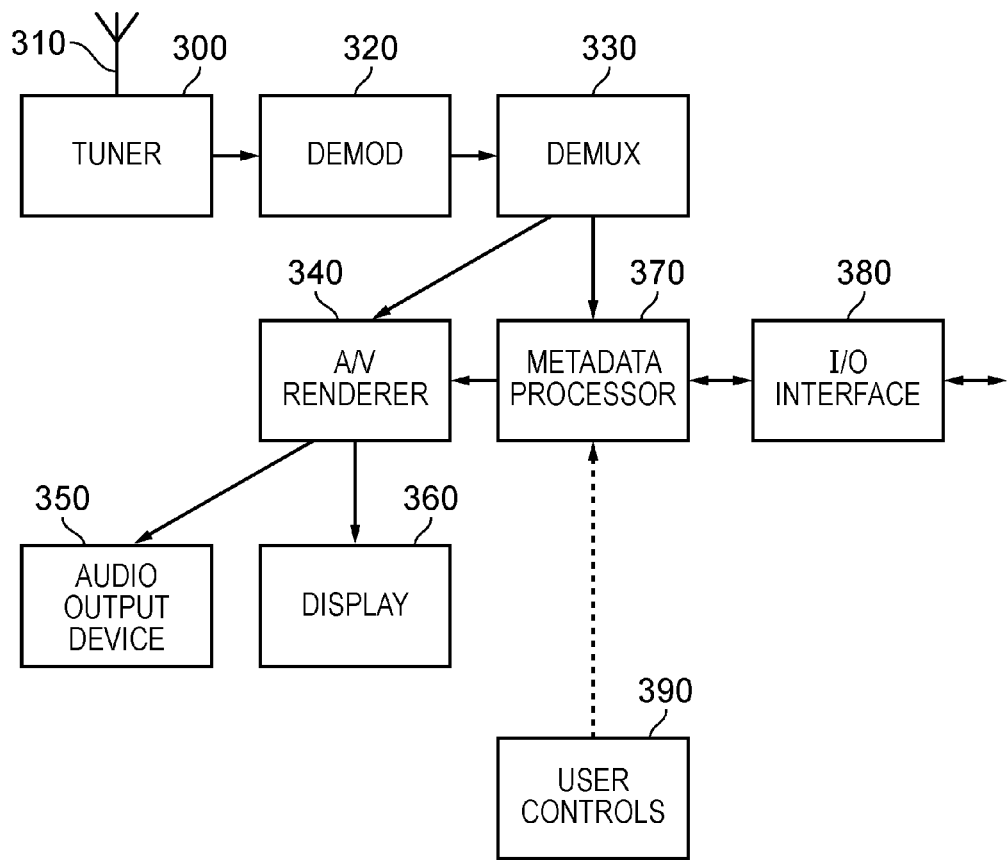
FIG. 9 schematically illustrates a content receiver.

FIG. 9 schematically illustrates a content receiver useable in a broadcast content distribution system comprising a content source and the content receiver, in which the content source broadcasts audio/video content for reception by content receivers with associated metadata defining links to other content for possible reproduction by the content receiver and information indicative of a category of each link. A tuner 300 receives radiofrequency signals from a signal source such as an antenna 310, although the signals could come from a cable distribution network, a satellite dish, an Internet connection or the like. In the case of signals modulated onto a radiofrequency carrier, the tuner provides a radiofrequency signal selected from the entire range of radiofrequency signals received by the antenna 310 to a demodulator 320 which converts the selected radiofrequency signal to a baseband data signal which in turn is passed to a demultiplexer 330. Analogous operation is provided by the tuner in the case of other types of signals such as IP television signals, such that the tuner acts to select one data stream from a plurality of possible data streams.

In many arrangements, digital television signals representing AV programmes are broadcast as groups or "multiplexes" of channels, with each multiplex being arranged with respect to a particular radiofrequency carrier frequency. In such cases, one of the roles of the demultiplexer 330 is to select one AV channel or programme from the group in response to user selection of a desired channel to view. Another role of the demultiplexer 330 is to separate out the audio data, video data and metadata relating to the selected AV channel.

The audio and video data are passed to an AV renderer 340 which generates audio data for output by an audio output device 350 and video data for output by a display 360. The audio output device 350 and the display 360 may or may not form part of the receiver under discussion. If they do not form part of the receiver then the receiver, acting as a set top box, can be connected to a suitable output device having a display screen and an audio output.

The metadata are passed to a metadata processor 370 which in turn is connected to an input/output (I/O) interface 380. The operation of the metadata processor and the input/output interface will be discussed below in more detail.

The whole receiver is under the control of user controls 390, which may be implemented as, for example, a hand-holdable remote commander device. In connection with the present discussion, the user controls are relevant to the operation of the metadata processor 370, but it will be appreciated that a single remote commander device can provide user controls for controlling other functions of the receiver, such as channel selection at the tuner, demodulator and demultiplexer level, volume control relating to the audio output device 350, display controls such as brightness and colour relating to the display 360 and so on. The function of the remote commander can be implemented by an application running on a smartphone or similar hand-holdable computing device.

Figure 10:
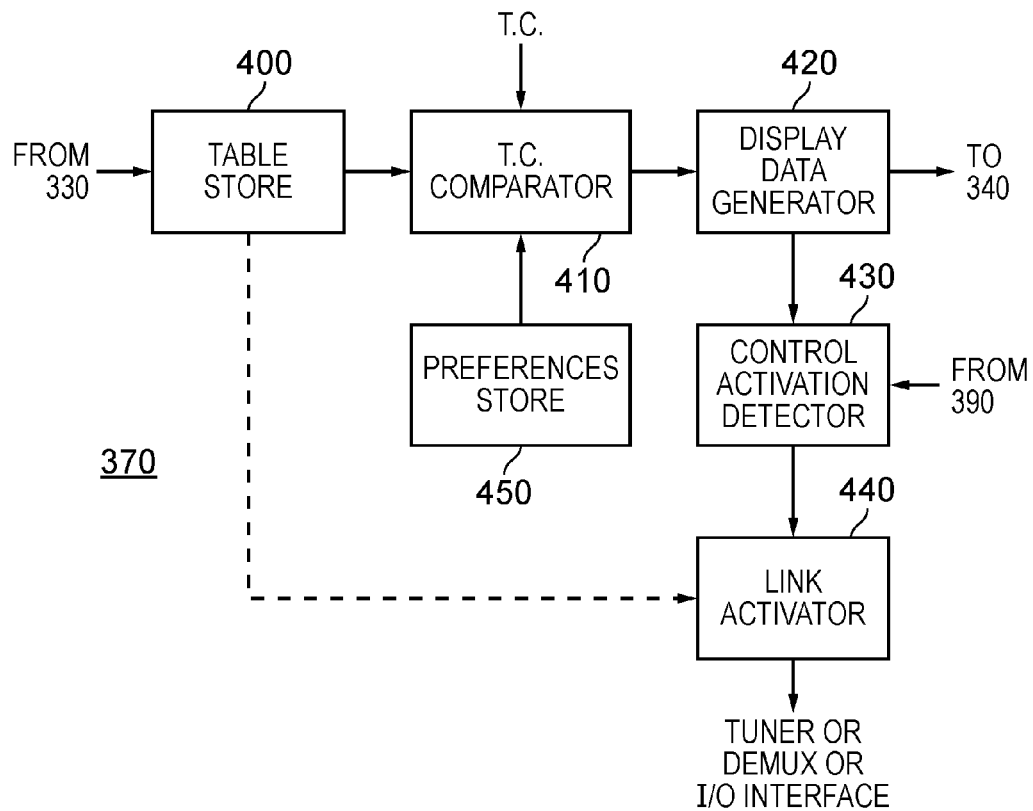
FIG. 10 schematically illustrates a metadata processor.

FIG. 10 schematically illustrates a metadata processor such as the metadata processor 370 of FIG. 9.

A function of the metadata processor 370 is to handle the selection, display and activation of links defined by metadata of the form shown schematically in FIG. 4. In embodiments, this is carried out as follows.

The received metadata is stored in a table store 400 which stores the metadata in, for example, a similar format to that shown in FIG. 4. A timecode comparator 410 receives timecode relating to the currently received AV programme from the demultiplexer 330. In a generally similar manner to the operations described with respect to the comparator 210 in FIG. 6, the timecode comparator 410 at the receiver compares the current timecode with timecode ranges defined in respect of entries in the metadata stored in the table store 400. In doing this, the timecode comparator 410 is checking for instances by which the current timecode relating to the currently received AV programme lies within a timecode range defined for an entry in the table store 400.

When such a match is found, which is to say that a particular entry in the table store 400 has a timecode range which includes the current timecode, data from the "information" field 180 relating to that entry are passed by the timecode comparator 410 to a display data generator 420 which generates display data to be passed to the renderer 340 for inclusion within the currently rendered output image on the display 360. The display data may define portions of the display which are to be superimposed by link indicators such as those shown schematically in FIGS. 7 and 8. In this way, the content receiver being configured to generate link information for display in dependence upon received metadata relating to links having a subset of categories (discussed below) while reproducing the broadcast audio/video content.

When the display data is provided to the renderer 340, the display data generator 420 controls a control activation detector 430 to detect activation of the user controls 390 in such a way that is relevant to the link information generated by the display data generator 420. For example, if the display data represents a red icon on the display screen, then the control activation detector 430 detects activation of the red button on the remote commander (an example of the user controls 390) while the red icon is displayed. Alternatively, if the display data represents a selectable icon link screen coordinates at which the user has to carry out an operation analogous to a mouse click, then the control activation detector 430 detects operation of the user controls at those screen coordinates.

If the control activation detector 430 detects the appropriate control activation while the link indicator is displayed in response to data generated by the display data generator 420, then a link activator 440 initiates activation of that link. Accordingly, the content receiver comprises a user control operable to select a link, the selection of a link for which link information is currently displayed by the content receiver causing the content receiver to reproduce content defined by that link.

Activation of the link depends on the nature of the link itself. If the link is a URL relating to an Internet address, then the link activator 440 instructs the input/output interface 380 to obtain data from that URL for display to the user, either as a full screen display or a windowed sub-area of the display. Alternatively, the link may represent or define another channel or programme which is being broadcast by the same or another broadcaster. In such cases, the link activator 440 instructs the tuner and/or the demultiplexer to obtain the AV data corresponding to the programme represented by the link. In order to achieve these functions, the link activator 440 may receive data from the table store 400 giving more information about the particular link.

The description so far relates to how the link information is displayed and then handled. As mentioned above, however, the question of whether the link is displayed at all does not only depends on whether the current timecode lies within a timecode range relevant to that link, but also on whether the link corresponds to a category within a subset of categories defined locally at the receiver. The subset of categories for a particular receiver will be referred to as preferred categories or "preferences" and are stored in a preferences store 450. In embodiments the preferences store acts as a category memory for storing category information defining the subset of categories, the content receiver being configured to modify the stored category information in dependence upon which links selected using the user control.

The preferences store 450 does not need to store anything other than category information. So, other types of information shown in FIG. 4 need not be stored. As discussed above, the categories may be expressed as mere codes having no assigned meaning at the receiver site other than that they occur in connection with certain instances of links.

In order to establish whether a link should be displayed, the timecode comparator 410 has a further mode of operation. In addition to checking that the current timecode lies within the timecode range relevant to an entry in the table store 400, the timecode comparator 410 also detects whether the category information stored in the table store 400 in respect of that entry corresponds to a category held within the preferences store 450. If so, then the operations discussed above proceed as described, and the link is displayed. If not, then subject to "training phase" operations to be described below, the link is not displayed.

Accordingly, the preferences store 450 can be implemented as a memory, such as a non-volatile memory, storing a simple list of categories for which the corresponding link should be displayed, if metadata relating to such a category is received as part of the broadcast signal. It should be noted that a single metadata item may relate to more than one category and its corresponding entry may include multiple sets of category data. In such cases, only one of the categories associated with an entry in the table store 400 needs to match category data in the preferences store 450 for the timecode comparator 410 to pass that link for display using the process described above.

In order for this system to work, the preferences store 450 needs to be populated and maintained. Various techniques for populating the metadata store will be described below, but in general terms the activation, by a user, of a link that has been displayed on the display screen will tend to add the category or categories relating to that link to the preferences store 450.

The matter of how any links get displayed in the first place in order for the user to affirm his interest in the corresponding categories will now be discussed.

One technique for achieving this is to operate a training mode or training phase of the apparatus. In one example, during a first period of operation of the receiver, such as the first month of operation, either all available links are displayed to the user (for example, via a popup menu allowing the user to activate a single control in order to see the available choice of links, to avoid overloading the user with too many links) or a systematic subset (such as every third link received as metadata for the currently viewed AV programme) is displayed. This gives the user the opportunity to develop preferences data based on a wide selection of available links. An upper limit of, for example, one link every 2 minutes can be imposed by the timecode comparator 410 during the training phase, in order to avoid annoying the user or overloading the user with too many links to choose from. Training operations can continue even after such an initial period, or indeed instead of such an initial period. For example, if a predetermined period such as 5 minutes has passed since a link was last displayed, the next available link can be displayed to the user within its appropriate timecode period but without having to demonstrate matching category data in the preferences store 450.

Other techniques for populating the preferences store 450 based on channel or programme selection will be described below.

Figure 11:
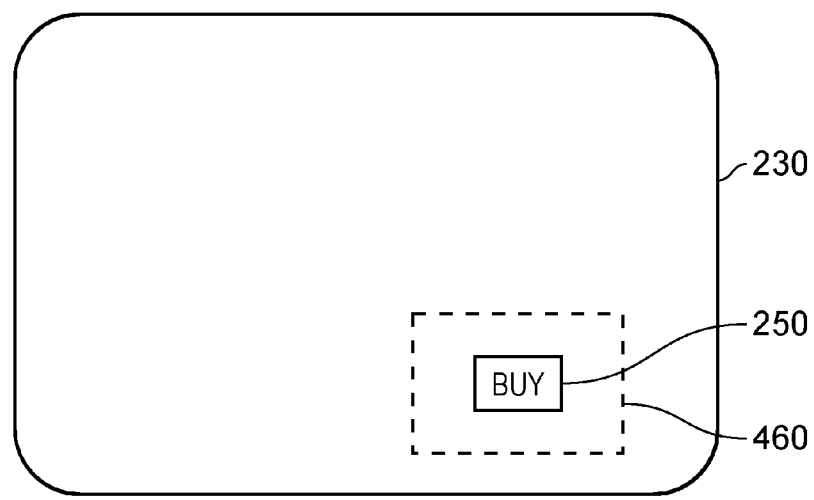
FIG. 11 schematically illustrates a tolerance around a user control position.

FIG. 11 schematically illustrates a tolerance around a user control position on the display screen 230. The example shown relates to the "buy" icon 250 of FIG. 7, but could apply to any arrangement in which the user is required, in order to activate a link, to carry out a user interface operation in respect of a particular area of the display screen 230.

A tolerance area 460 is defined around the icon 250. In an embodiment, the tolerance area 460 is arranged so that it does not overlap a corresponding tolerance area relating to any other currently displayed icons. If the user carries out the user interface operation, for example executing a mouse click, anywhere within the tolerance area 460, the control activation detector 430 treats it as though the user interface operation were carried out at the icon 250.

Figure 12:
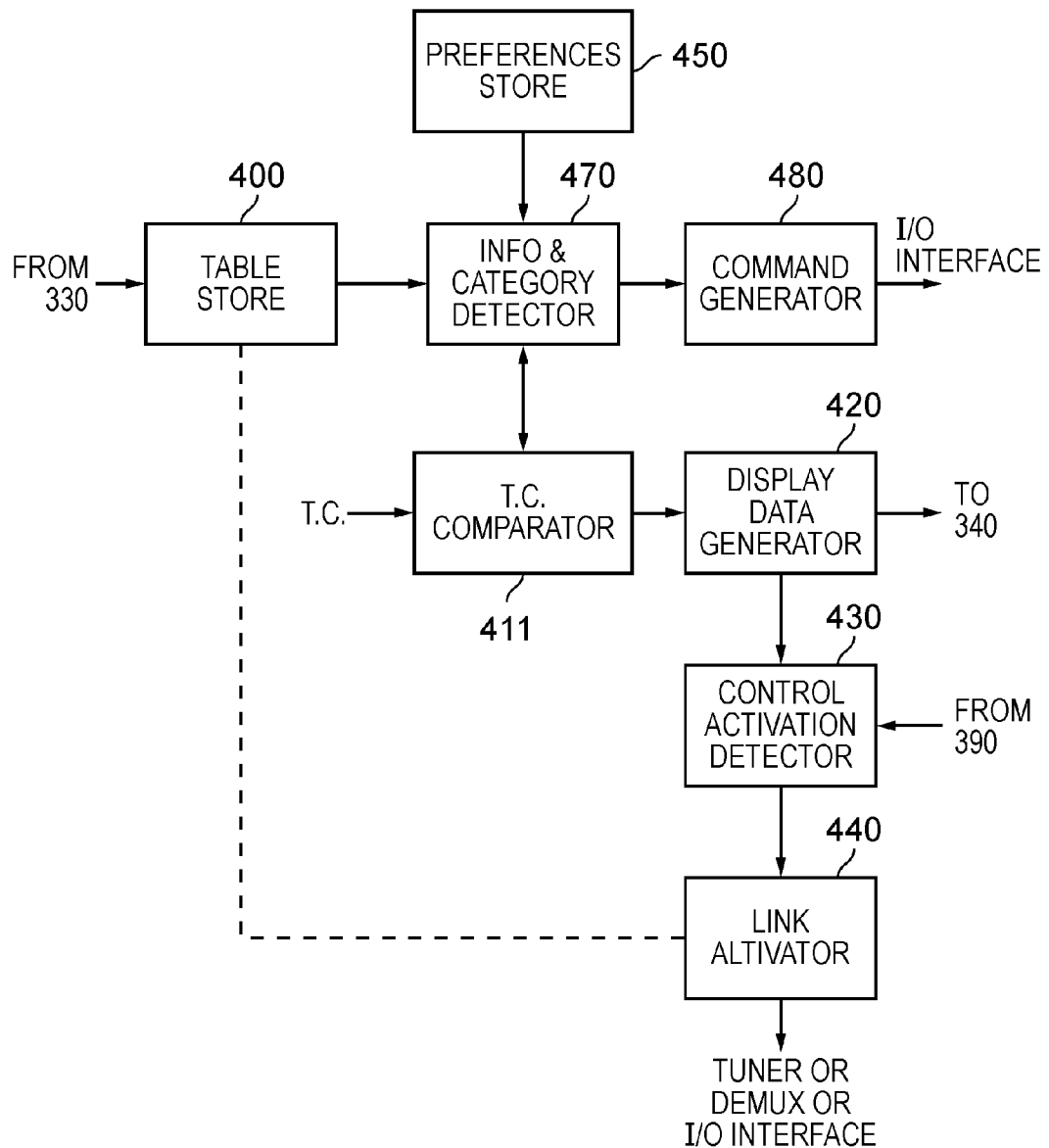
FIG. 12 schematically illustrates another example of a metadata processor.

FIG. 12 schematically illustrates another example of a metadata processor. Many of the features are identical to, or at least corresponding function with, respective features of FIG. 10. In such cases, identical reference numerals are used and the features will not be described in detail again.

As with FIG. 10, received metadata is stored in the table store 400. The stored metadata is accessed by an information and category detector 470 which also accesses data stored in the preferences store 450. The information and category detector 470 carries out various different tests on the metadata stored in the table store 400.

At a high level, the information and category detector 470 consults the information field 180 in the received metadata to detect whether the link represented by the metadata should be displayed at the content receiver, for example by being superposed over a rendered output image as shown in FIG. 7 or FIG. 8, or should be passed to the computing device 30 for handling, or both. This information can be defined by a flag or indicator in the information field 180; a default arrangement can be established by convention, such that if nothing is specified on this matter in the information field 180, the link is passed to the content receiver for handling.

A second test is also carried out in a similar manner to the one described above, in that the information and category detector 470 consults the subset of categories held by the preferences store 450 to detect whether the category associated with the entry under consideration in the table store 400 matches one of the subset of categories held by the preferences store 450. If so, then the link may be passed for further handling. If not, then either the link is ignored or, under the arrangements discussed above in respect of a training phase operation, the link may be passed for further handling to allow the user to express a preference for handling links of that category.

Note that the preferences store 450 may in fact store two separate subsets of categories, one relating to links which should be displayed at the display screen 230 and another relating to links which should be passed to the computing device 30 for handling. It is envisaged that the second of these subsets of categories may include a larger number of categories, because the user may be more tolerant of receiving subsidiary information on a separate computing device and therefore not interrupting viewing on the main display screen 230. However, populating the two lists would be a matter of individual user preferences.

A timecode comparator 411 is also provided which operates in a similar manner to the timecode-related operations of the timecode comparator 410 of FIG. 10. In other words, the timecode comparator 411 compares the timecode range relating to an entry in the table store 400 to establish whether the current timecode lies within that timecode range.

This comparison of timecode is maybe used in various different ways.

In one example, the timecode comparison applies only to those entries in the metadata table store 400 which have passed the tests set by the information and category detector 470 in such a way that they are selected for potential display at the receiver, in other words on the display screen 230. So in this arrangement, the information and category detector 470 generates a shortlist of links which (a) have an information field 180 indicating that they are appropriate for display on the display screen 230 of the receiver and (b) either correspond to a category in the subset stored in the preferences store 450 or fall within training phase operations. The shortlist is then tested against the current timecode to determine whether the current timecode falls within the timecode range appropriate to that entry.

In another example, the functions of the timecode comparator 411 and the information and category detector 470 can be combined, so that a link is tested against its information field, its category and its timecode before being passed either to the display data generator 420 or the command generator 480 or both.

If the information field indicates that the metadata should be passed to the computing device for handling, then the information and category detector 470 forwards the metadata to the command generator 480 which transmits a command to the computing device using the input/output interface 380.

Figure 13:
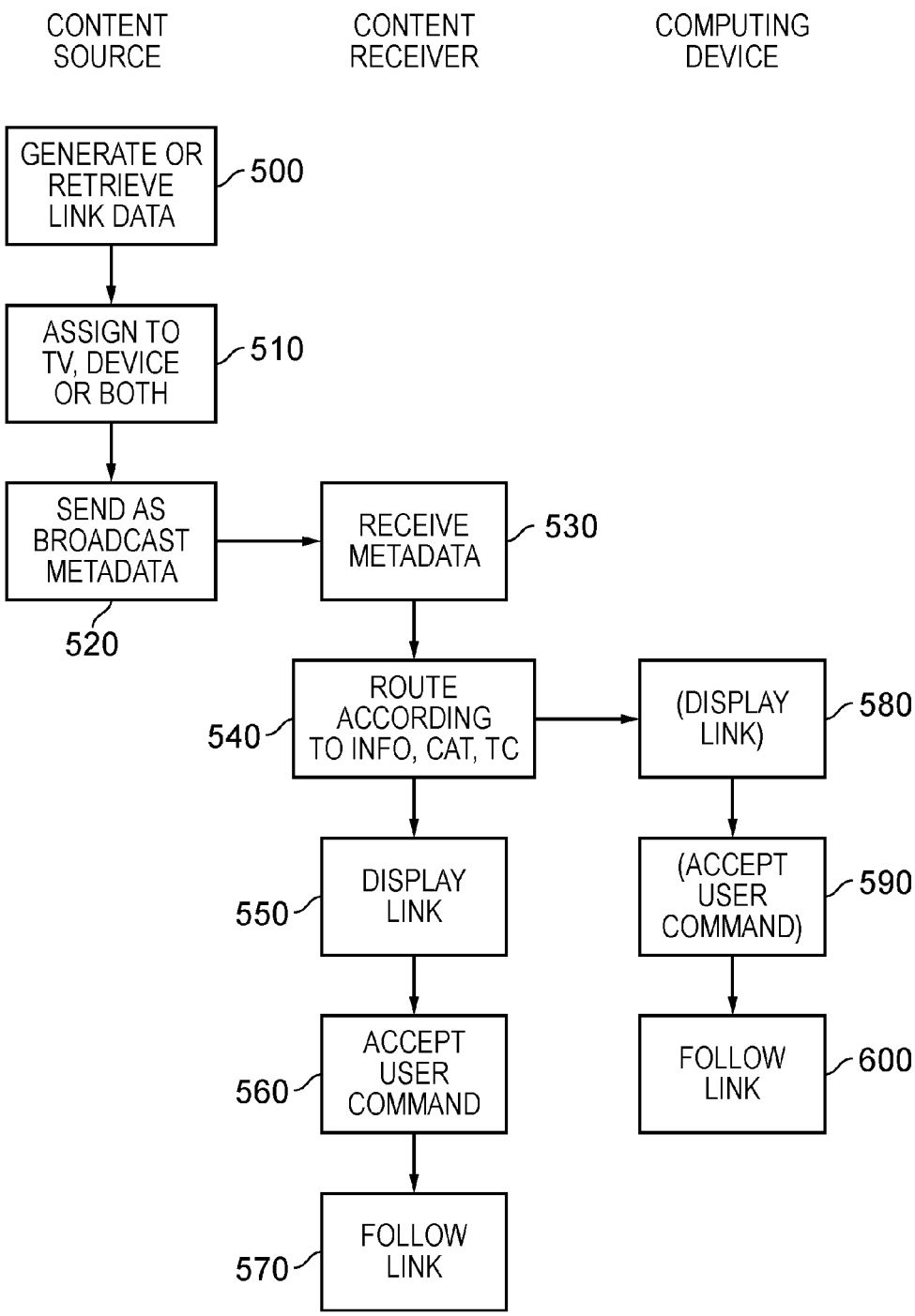
FIG. 13 is a flowchart illustrating operations carried out within the content broadcast system of FIG. 1.

FIG. 13 is a flowchart illustrating operations carried out within the content broadcast system of FIG. 1. A left-hand column of FIG. 13 relates to operations carried out at the content source or transmitter 10. A centre column of FIG. 13 relates to operations carried out at the content receiver 20 of FIG. 1. A right-hand column of FIG. 13 relates to operations carried out at the computing device 30 of FIG. 1.

At a step 500, the content source generates or retrieves link data, for example by accessing the metadata source 60 of FIG. 2. At a step 510, the link is assigned to the receiver, the computing device or both. Note that this step could be carried out before or after the step 500, depending on whether the metadata is pre-prepared for retrieval by the content source or is generated at the content source. The metadata is then multiplexed into a data stream for broadcast by the multiplexer 70 and is sent to the content receiver is as broadcast metadata at a step 520.

At a step 530, an individual content receiver receives the broadcast metadata. The metadata is then routed at a step 540 according to its information field, category and timecode by the information and category detector 470 and the timecode comparator 411 of FIG. 12, for example, making use of the subset of categories stored in the preferences store 450. The flowchart may then follow one or both of two different paths, in that control can pass from the step 540 to a step 550, to a step 580 or to both.

Accordingly, at the step 540, in an arrangement having a computing device connected for data transfer between the content receiver and the computing device, the content receiver is operable to transmit at least a subset of the metadata to the computing device; and the computing device has a display for displaying link information in dependence upon metadata received from the content receiver while the content receiver is reproducing the broadcast audio/video content. To achieve this, in embodiments the content receiver maintains a set of metadata categories (in for example the preferences store) in respect of which the content receiver sends received metadata to the computing device. Also, or as an alternative, the metadata can itself define whether a link may be transmitted by the content receiver to a computing device; and the content receiver is configured not to transmit metadata defining a link to the computing device unless the metadata defines that the link may be transmitted to the computing device.

The step 550 is carried out at the content receiver and relates to displaying the link by means of the display data generator 420 passing appropriate display data to the renderer 340 for display on the display screen 230 (corresponding to the display 360 of FIG. 9). Then, at a step 560, a user command executed using the user controls 390 is accepted or detected by the control activation detector 430. Then, at a step 570 the link activator 440 follows the link and obtains content or information defined by that link. The content or information can then be displayed to the user on the display screen 230.

The step 580 is similar to the step 550 but is carried out at the computing device 30. The link is displayed to the user, for example in a form similar to those shown in FIGS. 7 and 8, and at a step 590 the computing device except a user command via user controls of the computing device 30 which causes the computing device 30 to follow the link at a step 600 to download or obtain content or information defined by the link. In other words, the computing device comprises a user control operable to select a link displayed on the computing device and thereby to cause the computing device to access content defined by that link.

The text in the steps 580 and 590 of FIG. 13 is shown in parentheses. This is to indicate that these steps are, to an extent, optional. In normal operation, it is undesirable to interrupt the AV programme displayed on the main display screen 230 by subsidiary content or information derived from a metadata link, which is why a relatively non-intrusive icon is displayed to give the user the option to follow a metadata link. However, the same considerations do not necessarily apply to the computing device 30. If the user is watching a main programme on the display screen 230, it is possible for the user to set an mode of operation for the computing device 30 such that whenever a link is routed to the computing device by the step 540 (which means that the link has passed the information field, category and timecode tests), the computing device 30 automatically follows the link and displays content or information defined by that link. In such case, control would passed directly from the step 540 to the step 600.

Another optional feature of operation is that the content receiver and/or the computing device can detect, for example by detecting whether a short-range wireless connection between the two devices is activated, that the computing device is physically near to the content receiver, for example being within a threshold separation of (say) 5 meters of the content receiver. If the computing device is detected to be physically near to the content receiver then the steps 580, 590, 600 are implemented. If the computing device is detected not to be physically near to the content receiver, then even though a data connection (for example by a wireless network or Wi-Fi link) may be in place between the two devices, the steps 580, 590, 600 are not implemented.

Note also that the steps 580, 590, 600 can be deferred by the computing device. In one example, if the computing device is detected not to be physically near to the content receiver, the data sent (or to be sent) by the step 540 can be buffered at the computing device (assuming a separate communication channel is in place to receive that data) or at the content receiver, until the computing device is detected to be physically near to the content receiver. In another example, the information field relating to a metadata link may include geographical location data such that the steps 580, 590, 600 are deferred until the computing device detects (for example, via a location detector such as a GPS (global positioning system) detector (not shown)) that the computing device is at or within a threshold distance of the location specified in the information field. In such cases, the timecode comparison can be disregarded. As an example, the geographical location may relate to the physical location of a sports car dealer, and the link may relate to information about the sports car driven by the hero in the spy movie which the user recently watched. If the user happens to be near to the sports car dealer, the computing device could provide a link to information about that sports car or the dealer to prompt the user to make enquiries at the dealer about the car. This type of deferred location-based link may be appropriately given a validity period, so that the link is activated by a detection of geographical location only within a predetermined period (or a period set by data in the information field) after transmission of the metadata. An example of a suitable period is two weeks.

FIG. 14 schematically illustrates an example of the computing device 30. The computing device 30 comprises a processor or CPU 610, memory storage 620 such as read-only memory, random access memory, disk storage or the like, a display 630, user controls such as buttons, touch panels or the like 640, and input/output interface 650 and optionally a clock or timecode source 660, all connected together via a bus arrangement 670. As mentioned above, the computing device may be, for example, a mobile telephone, a tablet computer, a laptop computer or the like.

The computing device 30 operates under software control, the software being stored in the memory 620 and executed by the CPU 610 in cooperation with the other features defined by FIG. 14. The memory may be or may include, for example, a non-transitory machine-readable storage medium such as a non-volatile semiconductor memory, a magnetic disk medium or an optical disk medium. Communication with the content receiver is carried out over a wired or wireless link by the input/output interface 650. The clock source 660 can be used if a timecode comparison operation (similar to the timecode comparison carried out by the comparator 411) is performed locally at the computing device to determine whether or not to display a link. However, in the embodiments described above, this test can be carried out at the receiver such that only those links which pass the timecode test are routed to the computing device 30.

FIG. 15 schematically illustrates the preferences store 450. The preferences store is arranged to provide output data indicating a subset of categories (or, if separate subsets are used for the content receiver and the computing device, plural subsets of categories to the timecode comparator 410 in FIG. 10 or the information and category detector 470 in FIG. 12. However, the preferences store is also arranged to receive data in the form of updates to the subset or subsets of categories. Techniques for providing such update data will now be described, in which the content receiver is configured to modify the stored category information in dependence upon which broadcast programmes and/or broadcast channels and/or links are selected for viewing at that content receiver.

FIG. 16a is a schematic flowchart illustrating the processing of user commands by the control activation detector 430 of the content receiver. As well as accepting user commands for passing to the link activator 440 (in order to enable the step 570 of FIG. 13), the control activation detector 430 can also pass information to the preferences store 450 at a step 680, to update the subset or subsets of category information held by the preferences store 450. In embodiments, if a link is activated by a user command, then as well as passing control to the step 570 so that the link activator 440 may follow the link, the control activation detector 430 also passes a control signal to the preferences store 450 so that the preferences store 450 ads the category or categories of the currently activated link (as read from the table store 400) to the subset of categories held by the preferences store. If only one subset is held, the category is simply added to that subset. If multiple subsets corresponding to different devices are held, then the category of the currently activated link is added to the subset relating to the device under consideration, which in this case is the content receiver.

There has been described a simple technique for adding categories to the subset held by the preferences store 450. More advanced techniques are possible. For example, a category is added to the subset held by the preferences store 450 in response to a current activation, and a field held by the preferences store 450 in respect of that category, defining the "most recent activation date/time" for that category is updated to a current time and date. The preferences store 450 may then be operable to delete or disable any categories stored within a subset in situations where the most recent activation was more than a threshold time before the present time, an example of the threshold being one month. In this arrangement, the categories in the preferences store 450 do not become out of date or corrupted by an accidental one-time activation of a link in a certain category. In other embodiments, categories in the preferences store 450 can be ranked according to their frequency and/or most recent time of activation, such that more frequently or more recently (or both) activated link categories are preferentially displayed to the user in situations where more than a threshold number of links are received as metadata for display within a time period. For example, the user may set an option within the content receiver that the user wishes to be presented with no more than one link every 10 minutes of viewing, to avoid too much subjective disturbance to the viewed programming. If the received metadata includes more than this number of displayable links, the information and category detector 470 working in conjunction with the preferences store 450 can select from within the links which pass the information, category and timecode tests, according to the frequency of activation data stored by the preferences store 450, so that a most frequently selected category of link is allowed to be displayed to the user, and other categories of links are temporarily ignored.

FIG. 16b is similar to FIG. 16a but relates to the updating of stored category information held at the preferences store 450 in response to user commands executed at the computing device 30. As discussed above, in FIG. 13, the computing device 30 may accept a user command at a step 590 to cause the computing device to follow a selected link at a step 600. Before, after, or in parallel with the step 600, the computing device 30 sends update data relating to the command to the content receiver at a step 690. This data is transmitted from the input/output interface 650 of the computing device to the input/output interface 380 of the content receiver. At a step 680, the preferences store 450 at the content receiver is updated such that either a unitary list of categories is supplemented, as discussed above, or if a separate category subset is held in respect of the computing device, that subset is updated.

Figure 17:
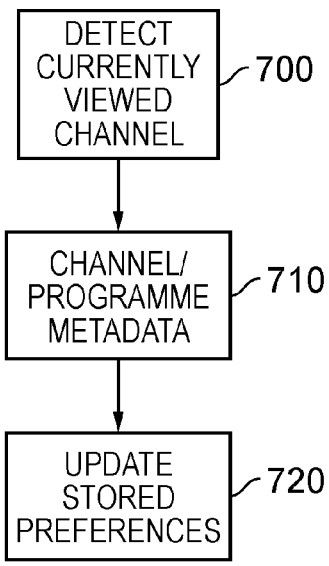
FIGS. 17 and 18 are schematic flowcharts illustrating the updating of stored preference data.
Figure 18:
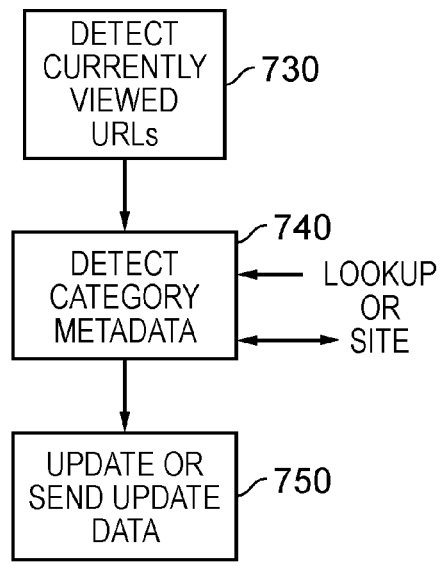

FIGS. 17 and 18 are schematic flowchart illustrating the updating of stored preference data using different criteria. In particular, in FIG. 17, the preference data is updated in response to a detection of a currently viewed AV channel or programme, and in FIG. 18, the preference data is updated in response to currently viewed or accessed Internet content.

Referring to FIG. 17, at a step 700 the content receiver (for example, the demultiplexer 330) detects a currently viewed channel and/or the selection of a new channel to view. The demultiplexer 330 accesses metadata associated with the channel and/or with the current programme being broadcast by that channel, at a step 710. The content source or broadcaster can include metadata associated with a channel, for example as part of electronic programme guide (EPG) data, which classifies the channel and/or the current programme according to the same categorisation as that used in the category field 170 in FIG. 4. In such cases, the preferences data relating to the subset of categories corresponding to the content receiver can be updated at a step 720 in accordance with the category associated with the currently viewed channel and/or programme.

FIG. 18 represents a similar process carried out in respect of currently viewed or accessed URLs. At a step 730, the content receiver (for example, the input/output interface 380) detects a currently viewed or accessed URL. Internet sites do not routinely have associated metadata in the form of category information appropriate to the category field 170 of FIG. 4, so that at a step 740 the content receiver either consults a lookup table of URLs and category information or queries a particular website, for example a website maintained by the broadcaster, which associates URLs with category information in the correct format. Based on category information obtained from the look up or the broadcaster website, at a step 750 the content receiver updates the stored preferences held by the preferences store 450.

In another possibility, the steps of FIG. 18 can be carried out by the computing device. In this case, the steps 730 and 740 are identical to those already described, but at the step 750 the computing device sends update data to the content receiver in a similar manner to the step 690 of FIG. 16*b*.

In all of the embodiments, it is possible for the links defined by the broadcast metadata to include referral data. Referral data does not necessarily affect the internet address accessed by a link, but can indicate to the host at that address where the link originated such that a small so-called "click through" payment can be made to the originator if the user follows the link, and/or a somewhat larger commission payment can be made if the referral actually leads to a sale. So, for example, if a link is to an automobile retailer, the following link could access a page appropriate to a certain model ("XYZ") of sports cars:

http://www.retailer_name.co.uk/model=XYZ

However, if further referral data is included, this need not change the internet page retrieved by the link (and indeed need not even be visible to a user) but will indicate to the retailer that the source of the link was the broadcaster (PQR), or the receiver manufacturer (for example, Sony®), or both:

http://www.retailer_name.co.uk/model=XYZ&broadcaster=PQR http://www.retailer_name.co.uk/model=XYZ&broadcaster=PQR&manufacturer=Sony http://www.retailer_name.co.uk/model=XYZ&manufacturer=Sony Various arrangements for dealing with breaks in broadcast AV content, for example those referred to as "commercial breaks", will now be described.

In the arrangements to be described below, a further use may be made of the preferences data stored by the preferences store 450, in order to select insertion content for reproduction during a so-called commercial break which is appropriate for the preferences of users of a particular content receiver. In embodiments, the broadcaster broadcasts multiple versions of commercial break insertion content, and the content receiver is operable to select locally an appropriate one of those versions for display to the user of that content receiver in response to locally stored preference information.

Figure 19:
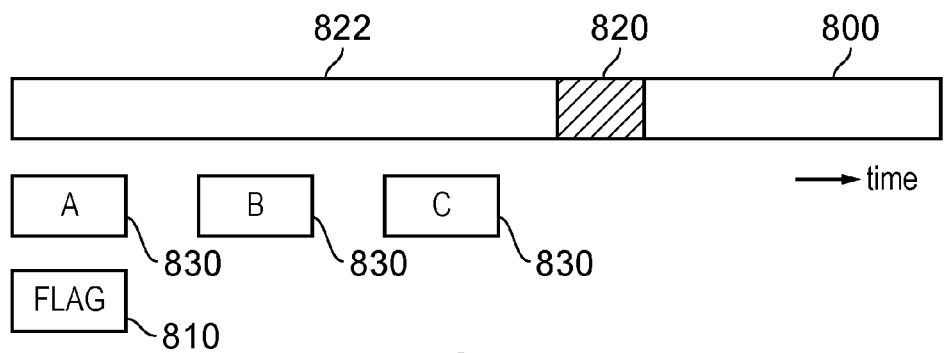
FIG. 19 schematically illustrates the concurrent broadcast of a main programme and break content along with break flags.

FIG. 19 schematically illustrates the concurrent broadcast of a main programme and break or insertion content along with break flags.

In FIG. 19, time is shown passing from left to right of the diagram. A main programme 800 for display, in common time periods, by all content receivers reproducing that programme is broadcast using a particular broadcast channel by the content source or transmitter 10. As associated metadata, the content source also broadcasts a break flag 810 which indicates a period 820 (which may be referred to as an insertion time period), within the main programme 800, designated as a commercial break.

Concurrently with the broadcast of the main programme, the broadcaster also broadcasts multiple possible different versions 830 of insertion content to the displayed during the commercial break period 820. Each version 830 has associated category data using the format of category information corresponding to that stored by the preferences store 450 and that used in the category field 170 of FIG. 4.

The multiple versions of the insertion content can be broadcast using, for example, a separate channel within the same multiplex or a different multiplex as that of the main programme 800. There are two considerations relating to the bit rate of the versions of the insertion content 830. Firstly, the broadcaster may make a commercial decision that the bit rate or data rate at which the insertion content is encoded could be less (or indeed, more) than the bit rate of the main programme. For example, the main programme may be encoded in high-quality high definition AV, whereas the insertion content may be encoded at a standard definition and so have a lower encoded bit rate. Secondly, unlike the main programme 800, the insertion content does not need to be broadcast in real-time. That is to say, the transmission bit rate of the insertion content can be lower than the display bit rate (the encoded bit rate) of that content. As an example, if the insertion content is encoded at an encoded bit rate of 6 Mbps (megabits per second), this would be the bit rate associated with the real-time display of that insertion content. However, the insertion content does not need to be broadcast at this bit rate; it could, for example, be broadcast at 1 Mbps. This would mean that the broadcast of the insertion content would take six times real-time, but in the arrangement being described here, that is not actually a problem, and the broadcast of the insertion content at a bit rate lower than its display bit rate can actually make more efficient use of a secondary channel by which the insertion content is broadcast. For example, the transmission bit rate (TBR) of the break material may be established in relation to the encoded bit rate (EBR) of the break material, according to the number n of candidate versions 830, the real-time length L1 of the break period 820 and the real-time length L2 of the programme portion 822 immediately preceding the break 820 (that is, the programme portion during which the versions 830 are transmitted) as:

$$TBR = \frac{n \times EBR \times L1}{L2}$$

This will provide that a low value of TBR is used while still providing time to transmit each of the n versions during the period 822.

So, under the arrangement of FIG. 19, the multiple instances of possible insertion content 830 broadcast in parallel with the main programme 800, such that the multiple instances 830 have all been transmitted to the content receivers before the time of the commercial break 820 (as indicated by the break flag 810).

At least one of the multiple instances is buffered at the receiver.

In other words, the receiver stores at least one of the multiple instances of insertion content 830 for replay during the commercial break period 820. In some embodiments, the receiver can store all of the different instances 830 to allow a selection to be made once all of the instances have been received. In other embodiments, particularly if the category data associated with the different instances 830 is broadcast before the instances 830 broadcast, the receiver may make a selection of one of the instances 830 and buffer only that one. The others can simply be ignored. Such an arrangement is facilitated in embodiments such that the metadata for all of the versions 830 is broadcast with (or at or near the time of broadcast of) the first of the versions. It may be repeated in respect of each broadcast version, in case the user switches on his content receiver or tunes to that channel part way through the transmission of the versions 830. The different versions or instances 830 do not need to be encoded at the same data rate, nor do they need to be broadcast at the same transmission data rate.

The decision as to which of the instances of insertion content 830 should be replayed to the user at the commercial break period 820 is based on category information associated with each instance and the subset of categories (or, where multiple subsets are stored, that subset of categories relating to the content receiver) stored by the preferences store 450.

Each of the instances 830 has one or more categories associated with it. The preferences store holds a subset of multiple categories. The metadata processor 370 accesses the preferences store and forms a comparison between the category or categories associated with each instance of the insertion content 830 and the categories held by the preferences store 450.

In the case where each instance of the insertion content 830 has the same number of categories associated with it (for example, one category for each such instance) then the test is a simple comparison to detect that instance 830 which has the highest number of matches with categories stored by the preferences store 450. If there are two or more instances 830 with an equal number of matches, then an arbitrary choice between them can be made by the metadata processor 370. If, in embodiments, further data is stored by the preferences store 450 relating to when a most recent activation of a link relating to a particular category was made, then in the case of two or more instances with an equal number of matches with the subset of categories in the preferences store, that instance which has a match with a most recently used category is selected.

The selected instance is replayed to the user during the commercial break period 820. That instance may be inhibited by the content receiver from being displayed again during a predetermined period such as the following two hours.

Accordingly, embodiments as described provide examples of an arrangement in which the content source is configured to broadcast audio/video programme content for reception by content receivers and for reproduction in real time as an audio/video programme; the content source broadcasts metadata indicative of common time periods within the programme content which are common to all content receivers reproducing that programme, and other insertion time periods within the programme content for which the content source provides the content receiver with data defining two or more possible content insertions for reproduction during those insertion time periods, the two or more possible content insertions having associated category information; and the content receiver is configured to reproduce the programme content during the common time periods and to select, in response to the stored category information defining the subset of categories, a content insertion from the two or more content insertions defined by the content source for reproduction during the content insertion time periods. In embodiments, the content source may broadcast two or more instances of insertion programme content during a common time period, for example sequentially, for example as part of the same multiplex as the main content but in a separate channel, and optionally at a lower data rate than the common programme content (which may indeed be at a lower data rate than the encoded data rate of the content insertion); and the content receiver may buffer at least one of the instances of insertion programme content for reproduction during a content insertion time period. Alternatively or in addition, the content receiver may be configured to download at least a part of the instance of the audio/video content stored on the internet server for use as insertion programme content during reproduction of the common programme content FIG. 20 schematically illustrates a modification of the receiver of FIG. 9 to allow for the buffering and processing of the insertion content 830.

Figure 20:
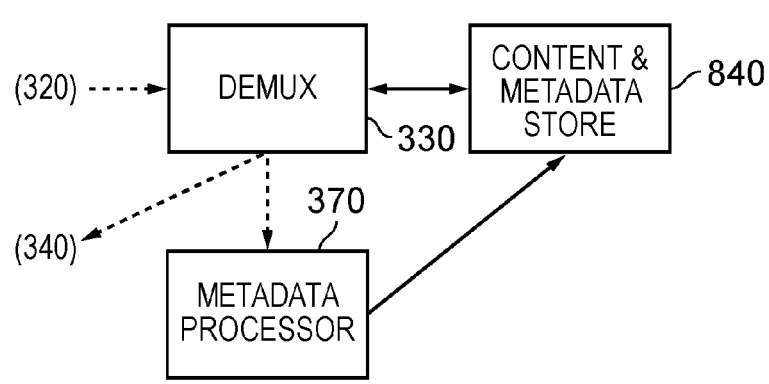
FIG. 20 schematically illustrates a modification of the receiver of FIG. 9.

In FIG. 20, a content and metadata store 840 is provided, in communication with the demultiplexer 330 and the metadata processor 370. The demultiplexer 330 is operable to pass the instances of insertion content 830 to the content and metadata store 840 for temporary storage. The metadata processor 370 is operable to pass data derived from the break flag 810 to the content and metadata store where it is temporarily stored. At the commercial break period 820, the metadata processor 370 is operable to initiate the replay of content stored in the content and metadata store 840 by instructing the content and metadata store 840 to output its stored content (one of the instances 830) to the demultiplexer 330 or directly to the renderer 340.

Figures 21, 22, 23:
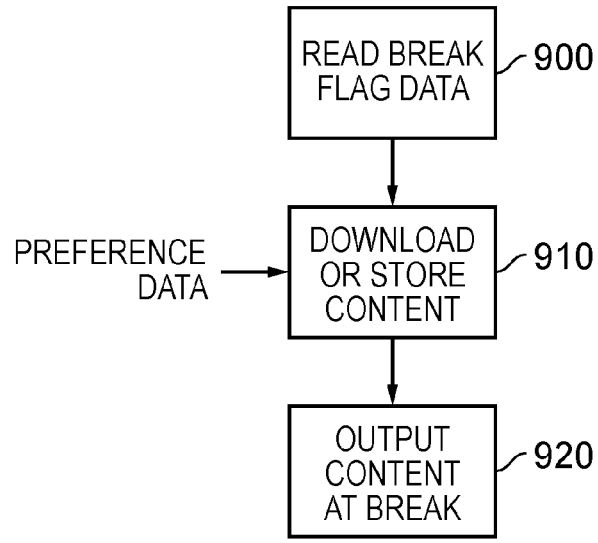
FIGS. 21 and 22 schematically illustrate possible formats of break flag data.
FIG. 23 is a schematic flowchart illustrating steps involved in the use of break flag data.

FIGS. 21 and 22 schematically illustrate possible formats of break flag data.

Referring to FIG. 21, a break flag 810 includes a timecode range 850 defining the time, within the main programme 800, of the commercial break 820, and multiple sets of data indicating the different instances of the insertion content (data 860) and categories associated with those instances (category data 870). The data 860 can indicate which channel and/or multiplex is used to broadcast each such instance.

FIG. 22 illustrates break flag data for use in a slightly different arrangement, in which the break flag metadata 810' indicates the URL 880 of an Internet source of content to be reproduced during the commercial break period 820, along with category data 870 as before. In this arrangement, the broadcaster does not broadcast the multiple instances of insertion content 830 at all, but instead simply sends metadata indicating a respective URL or link from which the content receiver can download the content to be reproduced during the commercial break period 820, along with category data allowing the content receiver to select one of the URLs according to category stored in the preferences store 450. In operation, the content receiver downloads at least one instance (for example, relating to a selected URL as discussed above) of the audio/video content referred to by that link and stored on an internet server for use as insertion programme content. The content receiver may carry out the downloading operation during reproduction of the common programme content.

Note that a particular receiver may be operable in respect of broadcast material for use in the insertion time periods and also downloaded material for use in respect of the insertion time periods, with (for example) the choice of material for a particular insertion time period depending at least in part on the metadata sent with or in respect of the main or common programme.

In other embodiments, if none of the versions 830 matches the stored user preferences, then the content receiver may obtain further alternative versions matched to the user preferences, perhaps from an internet or IP television source under direction of a URL provided within the information field of one or more of the versions 830. In general, delivering commercial break material over an IP television or internet link has the advantage that user viewing figures can be accurately detected, which in turn allows the revenue obtained from the companies sponsoring the commercials to be accurately assessed.

FIG. 23 is a schematic flowchart illustrating steps involved in the use of such break flag data as that shown in FIG. 21 or FIG. 22.

At a step 900, the metadata processor 370 accesses the received break flag data passed to it by the demultiplexer 330. The metadata processor 370 detects the category data 870 stored in the break flag metadata and, at a step 910 compares the received category data with the subset of categories stored in the preferences store 450 in order to make a selection of which instance of the broadcast insertion content 830 (in the case of FIGS. 19 and 21) should be buffered in the content and metadata store 840 for replay during the commercial break period 820, or which URL defined in the metadata of FIG. 22 should be used as a source for an instance of insertion content to be replayed during the commercial break period 820. Depending on which arrangement is in use, the step 910 involves storing the appropriate instance 830 or downloading the appropriate content according to its URL 880 for storage in the content and metadata store 840. In either case, under normal operational arrangements, the downloading or the storing operation would be complete before the start of the commercial break period 820, although in a limiting situation it is necessary only that the data is downloaded or stored in time for its actual replay during the commercial break period 820. At a step 920, the downloaded or stored content is output as replayed AV material to the user during the commercial break period 820.

It is possible for some or all of a commercial break period to contain compulsory commercial break material. So, for example, of a two-minute commercial break period, the first minute might relate to compulsory commercial content which the broadcaster requires to be displayed, whereas the second minute might be available for locally selectable commercial break insertion content. This can be easily handled by the arrangements described above, for example by setting the time range of the commercial break period 820 to relate only to the portion of the commercial break for which locally selectable insertion break content is allowed. So, in this arrangement, the compulsory portion of the commercial break is simply treated as part of the main programme 800.

In embodiments, as described, the content receiver is configured to detect a set of preferences of a user of the content receiver; the data defining two or more possible content insertions for reproduction during those insertion time periods includes preference data for comparison with the detected preferences at a content receiver; and the content receiver is configured to compare the detected preferences with the preference data to select a content insertion for reproduction. The content receiver may comprise a user control by which the user can indicate a preference for currently reproduced programme content, resulting in the storage of preference data relating to the currently reproduced programme content.

The arrangements described above relates to real-time or near real-time operation. However, corresponding techniques may be used in respect of stored AV material, for example AV material stored by a so-called personal video recorder (PVR) or content stored using a cloud computing recording system for instance.

When a television programme is stored by a conventional PVR, the commercial breaks which were broadcast at the time of the original programme broadcast are also stored by the PVR, at their respective time positions within the stored programme. This means that when the programme is replayed later from the PVR, the commercial break material may be out of date. For example, the commercial breaks may advertise programmes which were due to be broadcast after the original transmission of the stored programme but which are now in the past. Embodiments of the present disclosure provide a technique whereby up-to-date commercial break material can be inserted into AV programme content stored by a device such as a PVR.

Figure 24:
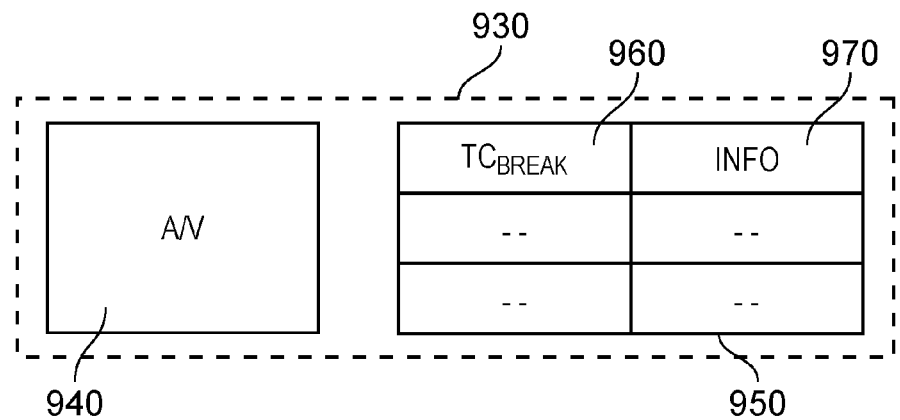
FIG. 24 schematically illustrates the format of content and metadata stored by a video storage device.

FIG. 24 schematically illustrates a possible format of content and metadata stored by a video storage device such as a PVR. The stored data 930 includes the AV content 940 as broadcast as the original transmission, and associated metadata 950 including timecode ranges 960 relating to commercial breaks (such as a commercial break 820) and any associated information 970 such as the genre or subject matter of the programme just before the commercial break, expressed as category data of the form discussed with respect to FIG. 4. Alternatively or in addition, the information field 970 can provide, for example, a URL of an Internet source of up-to-date commercial break insertion content for reproduction during that particular commercial break period. So, in this latter arrangement, it is possible either to have insertion content which can be selected by the replay device according to locally stored category information in the preferences store 450, or compulsory but up-to-date insertion content downloadable from an Internet source defined by a URL provided in the information field 970.

The metadata 950 can be derived directly from break flag data 810 received at the time of recording the programme. Alternatively, the metadata processor 370 could obtain the metadata 950 from a website maintained by the broadcaster, in response to the recording of a particular programme as the AV content 940.

Whilst the techniques have been described with reference to a PVR, any appropriate AV storage arrangement could be used.

Figure 25:
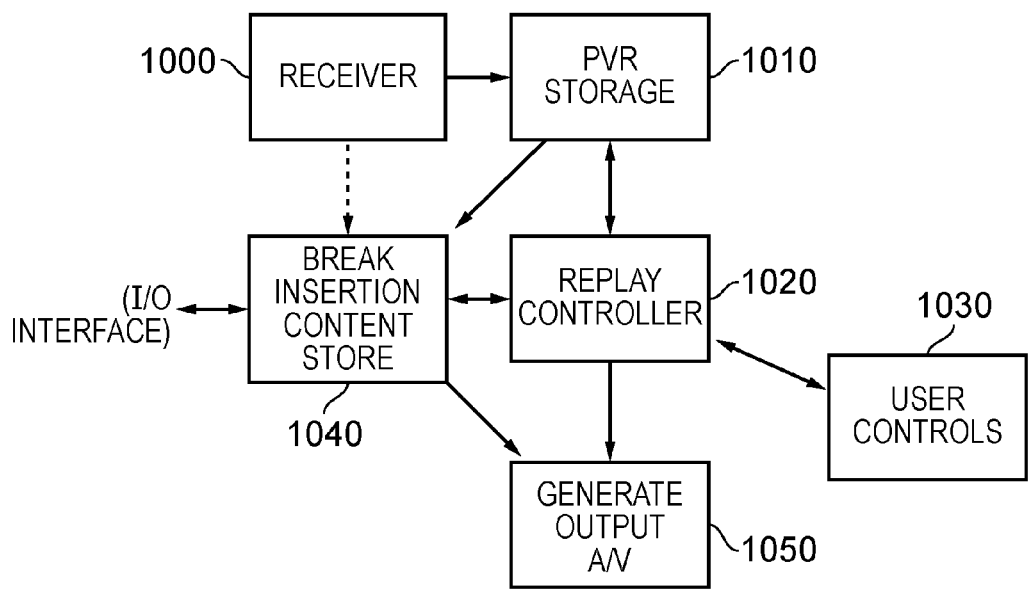
FIG. 25 schematically illustrates a video storage device.

FIG. 25 schematically illustrates a video storage device making use of these techniques.

A content receiver 1000, for example corresponding to a content receiver of the types described above, is arranged to store data of the format shown in FIG. 24 in PVR storage 1010 such as a hard disk store or a cloud-based store. A replay controller 1020 operates under the control of user controls 1030 to initiate and control the replay of AV material stored by the PVR storage 1010. The replay controller 1020 also controls the passage of metadata 950 from the PVR storage 1010 to a break insertion content store 1040. In response to the metadata 950, the break insertion content store 1040 accesses the URLs defined by the information field 970 and downloads commercial break insertion content (using, for example, and input/output interface of the receiver 1000) and buffers that insertion content for replay during commercial breaks in the replayed AV programme.

Finally an output AV generator 1050 produces an output programme for display to the user based on the stored AV content and the commercial break insertion content provided by the store 1040.

Embodiments include apparatus features as described above, methods of operation of those apparatus features, and data signals generated by or handled by the apparatus features.

Various aspects of the embodiments described above may be implemented in hardware, software or combinations of these. In particular, any one or more of the transmitter 10, the receiver 20 and the computing device 30 may be implemented at least in part by software-controlled data processing apparatus. It will be appreciated that such software, and a storage transmission medium by which such software is supplied (for example a non-transitory machine-readable storage medium such as a magnetic or optical disk or a flash memory) is also considered to represent an embodiment of the disclosure.

It will be apparent that numerous modifications and variations of the present disclosure are possible in light of the above teachings. It is therefore to be understood that within the scope of the appended claims, the technology may be practiced otherwise than as specifically described herein.

The invention claimed is:

1. A content receiver useable in a broadcast content distribution system comprising a content source and the content receiver, the broadcast content distribution system being a system in which the content source broadcasts audio/video content for reception by content receivers with associated metadata including links to other content for possible reproduction by the content receiver, including information indicative of a category of each link, and including information indicative of a location relating to content defined by each link,
wherein the content receiver includes circuitry configured to:
generate link information for display, based on the received metadata, relating to the links corresponding to a subset of categories while reproducing the broadcast audio/video content;
detect an operation of a user control to select a link included in the metadata, the selection of the link for which the link information is currently displayed causing the circuitry- to reproduce the content defined by the link;
store category information defining the subset of categories and modify the stored category information based on the selected link, the stored category information including a corresponding latest activation time for a corresponding category of the subset of categories, and the corresponding latest activation time for the corresponding category being updated based on a user selection of a corresponding link;
delete the corresponding category, from the stored category information when a difference between a current time and the corresponding latest activation time of the corresponding category exceeds a predetermined amount of time;
transmit at least a subset of the metadata to a computing device; and
cause display of corresponding link information, based on the subset of the metadata, on the computing device while the circuitry is reproducing the broadcast audio/video content and when a location of the computing device is within a threshold separation from the location relating to a corresponding content defined by a corresponding link included in the subset of the metadata, and
wherein the content receiver includes a memory to store the category information defining the subset of categories.

2. A content receiver according to claim 1, wherein the circuitry is configured to store the metadata for sending to the computing device in a buffer queue if the computing device is not detected within another threshold separation from the content receiver.

3. A content receiver according to claim 1, wherein the circuitry is configured to maintain a set of metadata categories based on which the circuitry sends the received metadata to the computing device.

4. A content receiver according to claim 1, wherein
the metadata defines whether one of the links can be transmitted by the circuitry to the computing device, and
the circuitry is configured not to transmit a portion of the metadata including the one of the links to the computing device unless the metadata defines that the one of the links can be transmitted to the computing device.

5. A content receiver according to claim 1, wherein the circuitry is configured to modify the stored category information based on broadcast programmes and/or broadcast channels selected for viewing.

6. A broadcast content distribution system comprising:
a content receiver useable in a broadcast content distribution system comprising a content source and the content receiver, the broadcast content distribution system being a system in which the content source broadcasts audio/video content for reception by content receivers with associated metadata including links to other content for possible reproduction by the content receiver, including information indicative of a category of each link, and including information indicative of a location relating to content defined by each link,
wherein the content receiver includes circuitry configured to:
generate link information for display, based on the received metadata, relating to the links corresponding to a subset of categories while reproducing the broadcast audio/video content;
detect an operation of a user control to select a link included in the metadata, the selection of the link for which the link information is currently displayed causing the circuitry to reproduce the content defined by the link;
store category information defining the subset of categories and modify the stored category information based on the selected link, the stored category information including a corresponding latest activation time for a corresponding category of the subset of categories, and the corresponding latest activation time for the corresponding category being updated based on a user selection of a corresponding link;
delete the corresponding category, from the stored category information when a difference between a current time and the corresponding latest activation time of the corresponding category exceeds a predetermined amount of time;
transmit at least a subset of the metadata to a computing device; and
cause display of corresponding link information, based on the subset of the metadata, on the computing device while the circuitry is reproducing the broadcast audio/video content and when a location of the computing device is within a threshold separation from the location relating to a corresponding content defined by a corresponding link included in the subset of the metadata, and
wherein the content receiver includes a memory to store the category information defining the subset of categories; and
the content source configured to broadcast said audio/video content for reception by said content receivers with said associated metadata including said links to said other content for possible reproduction by the content receiver, including said information indicative of said category of each link, and including said information indicative of the location relating to the content defined by each link.

7. A broadcast content distribution system according to claim 6, wherein the content source includes other circuitry configured to:
broadcast audio/video programme content for reception by said content receivers and for reproduction in real time as an audio/video programme,
broadcast said metadata indicative of common time periods within the audio/video programme content which are common to all said content receivers reproducing the audio/video programme, and other insertion time periods within the audio/video programme content for which the other circuitry provides the circuitry with data defining two or more possible content insertions for reproduction during the insertion time periods, the two or more possible content insertions having associated category information, and
wherein the circuitry is configured to reproduce the audio/video programme content during the common time periods and to select, in response to the stored category information defining the subset of categories, a content insertion from the two or more possible content insertions defined by the other circuitry for reproduction during the content insertion time periods.

8. A broadcast content distribution system according to claim 7, wherein
the other circuitry is configured to broadcast two or more instances of insertion programme content during a common time period, and
the circuitry is configured to buffer at least one of the instances of the insertion programme content for reproduction during a content insertion time period.

9. A broadcast content distribution system according to claim 8, wherein the other circuitry is configured to broadcast the two or more instances of the insertion programme content sequentially.

10. A broadcast content distribution system according to claim 8, wherein the other circuitry is configured to broadcast the audio/video programme content using a digital video broadcasting multiplex, the insertion programme content being broadcast using a separate channel, within the digital video broadcasting multiplex, to a common programme content.

11. A broadcast content distribution system according to claim 10, wherein the other circuitry is configured to broadcast the insertion programme content at a lower data rate than the common programme content.

12. A broadcast content distribution system according to claim 11, wherein the insertion programme content is encoded at a lower data rate than the common programme content.

13. A broadcast content distribution system according to claim 7, wherein
the data defining the two or more possible content insertions comprises respective links to the audio/video content stored on an internet server, and
the circuitry is configured to receive data including the links and to download at least one instance of the audio/video content stored on the internet server for use as insertion programme content.

14. A broadcast content distribution system according to claim 13, wherein the circuitry is configured to download at least a part of the one instance of the audio/video content stored on the internet server for use as the insertion programme content during reproduction of common programme content.

15. A method of content reception for use in a broadcast content distribution system comprising a content source and a content receiver, the broadcast content distribution system being a system in which the content source broadcasts audio/video content for reception by content receivers with associated metadata including links to other content for possible reproduction by the content receiver, including information indicative of a category of each link, and including information indicative of a location relating to content defined by each link, the method comprising the steps of:
generating, using circuitry of the content receiver, link information for display, based on the received metadata, relating to the links corresponding to a subset of categories while reproducing the broadcast audio/video content;
detecting, using the circuitry an operation of a user control by which a link, included in the metadata, is selected to cause the circuitry to reproduce the content defined by the link for which the link information is currently displayed;
modifying stored category information defining the subset of categories based on the link selected using the user control, the stored category information including a corresponding latest activation time for a corresponding category of the subset of categories, and the corresponding latest activation time for the corresponding category being updated based on a user selection of a corresponding link;
deleting, using the circuitry, the corresponding category from the stored category information when a difference between a current time and the corresponding latest activation time of the corresponding category exceeds a predetermined amount of time;
transmitting, using the circuitry, at least a subset of the metadata to a computing device connected for data transfer between the circuitry and the computing device; and
displaying corresponding link information, using the computing device, based on the subset of the metadata received from the circuitry while the circuitry is reproducing the broadcast audio/video content and when a location of the computing device is within a threshold separation from the location relating to a corresponding content defined by a corresponding link included in the subset of the metadata.

16. A non-transitory computer readable medium including computer program instructions, which when executed by a computer causes the computer to perform the method of claim 15.

17. A content receiver according to claim 1, wherein the link information and the audio/video content are simultaneously displayed such that the link information is superimposed on the displayed audio/video content.

18. A content receiver according to claim 1, wherein the metadata includes a time period for each of the links, the time period corresponding to a period for displaying the link information relating to the links during reproduction of the broadcast audio/video content.

19. A content receiver according to claim 1, wherein the circuitry is configured to determine a manner for displaying the link information relating to the links based on information indicative of the manner for displaying each link included in the received metadata, the manner for displaying the link information being at least one of a position, color, size, and shape of the link information.

20. A content receiver according to claim 1, wherein the circuitry is configured to generate a tolerance area around the displayed link information, and wherein the circuitry is configured to detect the user selection of the displayed link information when the user selects a portion of the tolerance area around the displayed link information.

21. A content receiver according to claim 1, wherein the circuitry is configured to receive a user limit on a maximum number of links to be presented to a user within a predetermined period of time, and wherein the circuitry is configured to generate the link information for display based on the user limit.

* * * * *